(12) United States Patent
Barenbrug et al.

(10) Patent No.: US 9,809,273 B2
(45) Date of Patent: Nov. 7, 2017

(54) FOLDABLE VEHICLE

(71) Applicant: Royalty Bugaboo GmbH, Zug (CH)

(72) Inventors: Machiel Gerardus Theodorus Marie Barenbrug, Amsterdam (NL); Vincent Bernardus Hubertus Ten Horn, Haarlem (NL)

(73) Assignee: ROYALTY BUGABOO GMBH, Zug (CH)

( * ) Notice: Subject to any disclaimer, the term of this patent is extended or adjusted under 35 U.S.C. 154(b) by 0 days.

(21) Appl. No.: 15/114,828

(22) PCT Filed: Feb. 11, 2015

(86) PCT No.: PCT/EP2015/052844
§ 371 (c)(1),
(2) Date: Jul. 27, 2016

(87) PCT Pub. No.: WO2015/121289
PCT Pub. Date: Aug. 20, 2015

(65) Prior Publication Data
US 2016/0355231 A1 Dec. 8, 2016

(30) Foreign Application Priority Data
Feb. 12, 2014 (NL) .................................. 2012245

(51) Int. Cl.
*B62B 1/00* (2006.01)
*B62K 15/00* (2006.01)
(Continued)

(52) U.S. Cl.
CPC ............ *B62K 15/008* (2013.01); *B62K 11/02* (2013.01); *B62K 13/00* (2013.01); *B62K 15/00* (2013.01); *B62K 2015/005* (2013.01)

(58) Field of Classification Search
CPC ...... B62K 15/008; B62K 11/02; B62K 13/00; B62K 15/00
See application file for complete search history.

(56) References Cited

U.S. PATENT DOCUMENTS

| 3,434,558 A | 3/1969 | Allen |
| 3,698,502 A | 10/1972 | Patin |

(Continued)

FOREIGN PATENT DOCUMENTS

| AU | 2005202225 A1 | 12/2005 |
| CA | 2513171 A1 | 12/2006 |

(Continued)

OTHER PUBLICATIONS

International Search Report and Written Opinion issued in International Application No. PCT/EP2015/052844.

*Primary Examiner* — John Walters
*Assistant Examiner* — James Triggs
(74) *Attorney, Agent, or Firm* — Kenealy Vaidya LLP

(57) ABSTRACT

Some embodiments are directed to a foldable vehicle for use as a vehicle if being unfolded, and for use as a trolley if being folded. The vehicle in its folded configuration may also be placed in an upright parking position. The vehicle includes a first side frame coupled to a first wheel, a second side frame coupled to a second wheel and a coupling frame. The coupling frame includes a hinge joint between a first end and a second end of the coupling frame. The first end is hinged to the first side frame and the second end is hinged to the second side frame. When the first wheel translates towards the second wheel, the hinge joint moves from one side of the second wheel to the other side of the second wheel.

16 Claims, 9 Drawing Sheets

(51) Int. Cl.
  *B62K 13/00*  (2006.01)
  *B62K 11/02*  (2006.01)

(56) References Cited

U.S. PATENT DOCUMENTS

| | | | |
|---|---|---|---|
| 4,072,325 A | 2/1978 | Bright et al. | |
| 4,351,410 A | 9/1982 | Townsend | |
| 5,730,453 A | 3/1998 | Owsen | |
| 6,367,824 B1* | 4/2002 | Hayashi | B62K 5/05 |
| | | | 280/124.103 |
| 6,623,023 B2 | 9/2003 | Niitsu et al. | |
| 7,059,621 B2 | 6/2006 | Di Blasi et al. | |
| 7,451,848 B2 | 11/2008 | Flowers et al. | |
| 8,636,293 B2 | 1/2014 | Eliasson | |
| 9,428,065 B2 | 8/2016 | Lee et al. | |
| 9,440,698 B2 | 9/2016 | Dadoosh et al. | |
| 2003/0047363 A1 | 3/2003 | Makuta et al. | |
| 2003/0051934 A1 | 3/2003 | Ou | |
| 2005/0121866 A1 | 6/2005 | Kamen et al. | |
| 2005/0151345 A1 | 7/2005 | Chen | |
| 2006/0037801 A1 | 2/2006 | Iwashita | |
| 2006/0131091 A1 | 6/2006 | Lin | |
| 2009/0020352 A1 | 1/2009 | Horii et al. | |
| 2010/0066053 A1 | 3/2010 | Blasi et al. | |
| 2010/0187034 A1* | 7/2010 | Wang | B62K 15/008 |
| | | | 180/208 |
| 2011/0144845 A1 | 6/2011 | Takenaka | |
| 2011/0238247 A1 | 9/2011 | Yeh et al. | |
| 2011/0248467 A1 | 10/2011 | Ball et al. | |
| 2011/0303475 A1 | 12/2011 | Kim | |
| 2012/0043148 A1 | 2/2012 | Brady et al. | |
| 2012/0065825 A1 | 3/2012 | Nicoson | |
| 2012/0103706 A1 | 5/2012 | Kondo et al. | |
| 2012/0187881 A1 | 7/2012 | Tadano et al. | |
| 2012/0203407 A1 | 8/2012 | Hatanaka et al. | |
| 2012/0217072 A1 | 8/2012 | Hoffmann et al. | |
| 2016/0355231 A1 | 12/2016 | Barenbrug et al. | |

FOREIGN PATENT DOCUMENTS

| | | |
|---|---|---|
| CN | 2673779 Y | 1/2005 |
| CN | 2690277 Y | 4/2005 |
| CN | 1657357 A | 8/2005 |
| CN | 2752149 Y | 1/2006 |
| CN | 2915653 Y | 6/2007 |
| CN | 101020483 A | 8/2007 |
| CN | 201026968 Y | 2/2008 |
| CN | 201026970 Y | 2/2008 |
| CN | 201296182 Y | 8/2009 |
| CN | 201380935 Y | 1/2010 |
| CN | 201445111 U | 5/2010 |
| CN | 201472552 U | 5/2010 |
| CN | 101804839 A | 8/2010 |
| CN | 101870317 A | 10/2010 |
| CN | 101870319 A | 10/2010 |
| CN | 201660071 U | 12/2010 |
| CN | 201721571 U | 1/2011 |
| CN | 201792954 U | 4/2011 |
| CN | 201951638 U | 8/2011 |
| CN | 102285415 A | 12/2011 |
| CN | 202080398 U | 12/2011 |
| CN | 202593728 U | 12/2012 |
| CN | 202608850 U | 12/2012 |
| CN | 202624516 U | 12/2012 |
| CN | 0N202703802 U | 1/2013 |
| CN | 202728468 U | 2/2013 |
| CN | 202896789 U | 4/2013 |
| CN | 103144724 A | 6/2013 |
| CN | 103171714 A | 6/2013 |
| CN | 203032849 U | 7/2013 |
| CN | 203094323 U | 7/2013 |
| CN | 203094354 U | 7/2013 |
| CN | 203094355 U | 7/2013 |
| CN | 203142920 U | 8/2013 |
| CN | 203142959 U | 8/2013 |
| CN | 203158167 U | 8/2013 |
| CN | 103274005 A | 9/2013 |
| CN | 203172808 U | 9/2013 |
| CN | 203211450 U | 9/2013 |
| CN | 203211451 U | 9/2013 |
| CN | 203255322 U | 10/2013 |
| CN | 203268251 U | 11/2013 |
| CN | 203294266 U | 11/2013 |
| CN | 103523136 A | 1/2014 |
| CN | 103569276 A | 2/2014 |
| CN | 203497098 U | 3/2014 |
| DE | 2621644 A1 | 12/1976 |
| DE | 3128112 A1 | 2/1983 |
| DE | 69903260 T2 | 6/2003 |
| DE | 202011103691 U1 | 11/2011 |
| EP | 0116096 A1 | 8/1984 |
| EP | 0251906 A1 | 1/1988 |
| EP | 0369863 A1 | 5/1990 |
| EP | 0606191 A1 | 7/1994 |
| EP | 3955232 A2 | 11/1999 |
| EP | 1004505 A2 | 5/2000 |
| EP | 0992422 A2 | 12/2000 |
| EP | 1419085 B1 | 5/2004 |
| EP | 1484239 A2 | 12/2004 |
| EP | 1522489 A2 | 4/2005 |
| EP | 1798080 A1 | 6/2007 |
| EP | 1927539 A3 | 9/2008 |
| EP | 2336014 A1 | 6/2011 |
| EP | 2361827 A2 | 8/2011 |
| EP | 2390171 A1 | 11/2011 |
| EP | 2436581 A2 | 4/2012 |
| EP | 2483140 A1 | 8/2012 |
| EP | 2505405 A1 | 10/2012 |
| EP | 2505406 A1 | 10/2012 |
| EP | 2505422 A2 | 10/2012 |
| EP | 2670653 A1 | 12/2013 |
| FR | 2815010 A1 | 4/2002 |
| FR | 2939726 A1 | 6/2010 |
| FR | 2993233A1 A1 | 1/2014 |
| GB | 1505224 A | 3/1978 |
| GB | 2082517 A | 3/1982 |
| GB | 2260520 A | 4/1993 |
| GB | 2414972 A | 12/2005 |
| GB | 2453796 A | 12/2005 |
| JP | 06329068 | 11/1994 |
| JP | H06329068 A | 11/1994 |
| JP | H1111372 A | 1/1999 |
| JP | 20020120758 | 9/2002 |
| JP | 2003026066 A | 1/2003 |
| JP | 2003175876 A | 6/2003 |
| JP | 3643819 B2 | 1/2004 |
| JP | 2004106780 A | 4/2004 |
| JP | 2004106781 A | 4/2004 |
| JP | 2004262374 A | 9/2004 |
| JP | 2005028990 A | 2/2005 |
| JP | 2005193740 A | 7/2005 |
| JP | 2005219633 A | 8/2005 |
| JP | 2005335471 A | 12/2005 |
| JP | 3821776 B2 | 9/2006 |
| JP | 2007209731 A | 8/2007 |
| JP | 2010284978 A | 12/2010 |
| JP | 2011125164 A | 6/2011 |
| JP | 2011136626 A | 7/2011 |
| JP | 2011183845 A | 9/2011 |
| KR | 101241436 B1 | 3/2012 |
| KR | 10-1209930 B1 | 12/2012 |
| NL | 1032036 C2 | 11/2007 |
| NL | 2003040 C | 12/2010 |
| RU | 2302970 C2 | 7/2007 |
| RU | 2342279 C2 | 12/2008 |
| TW | 200843997 A | 11/2008 |
| WO | 9961304 A1 | 12/1999 |
| WO | 03016124 A1 | 2/2003 |
| WO | 2005105560 A1 | 11/2005 |
| WO | 2006003489 A1 | 1/2006 |
| WO | 2007043447 A1 | 4/2007 |
| WO | 2008044838 A1 | 4/2008 |
| WO | 2010091460 A1 | 8/2010 |
| WO | 2011036424 A1 | 3/2011 |

(56) References Cited

FOREIGN PATENT DOCUMENTS

| WO | 2011051372 A1 | 5/2011 |
| WO | 2011107674 A1 | 9/2011 |
| WO | 2011120124 A1 | 10/2011 |
| WO | WO2011147269 A1 | 12/2011 |
| WO | 2012059902 A2 | 5/2012 |
| WO | 2012104548 A1 | 8/2012 |
| WO | 2012117641 A1 | 9/2012 |
| WO | WO2012164208A1 A1 | 12/2012 |
| WO | 2014013486 A3 | 5/2014 |

* cited by examiner

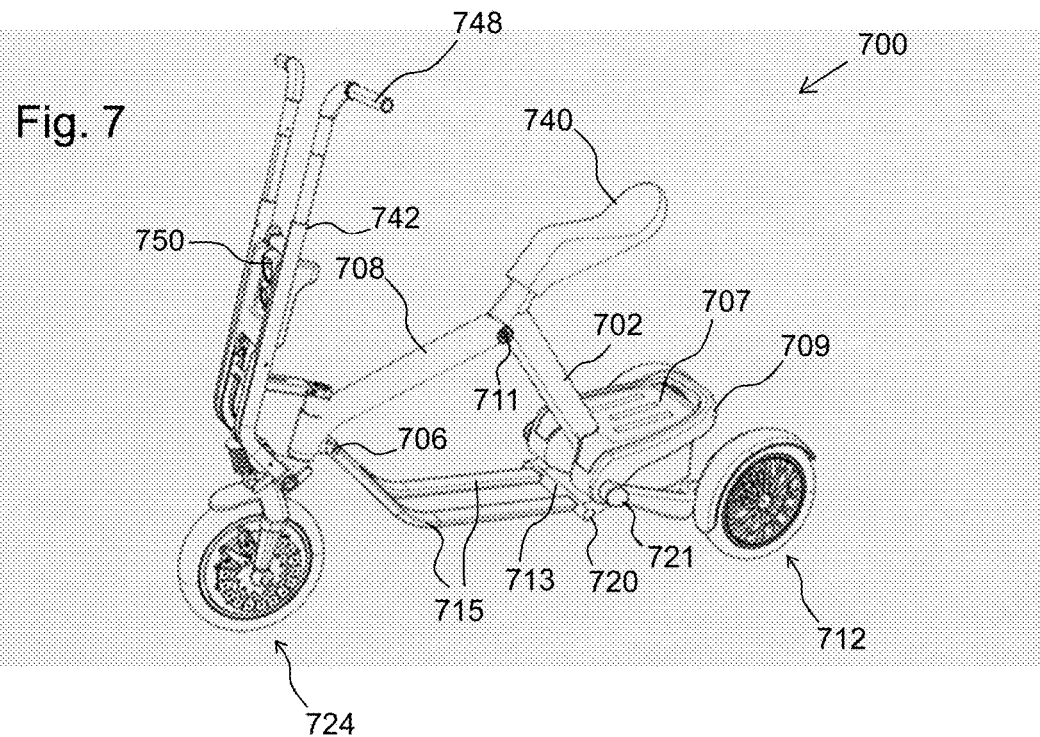
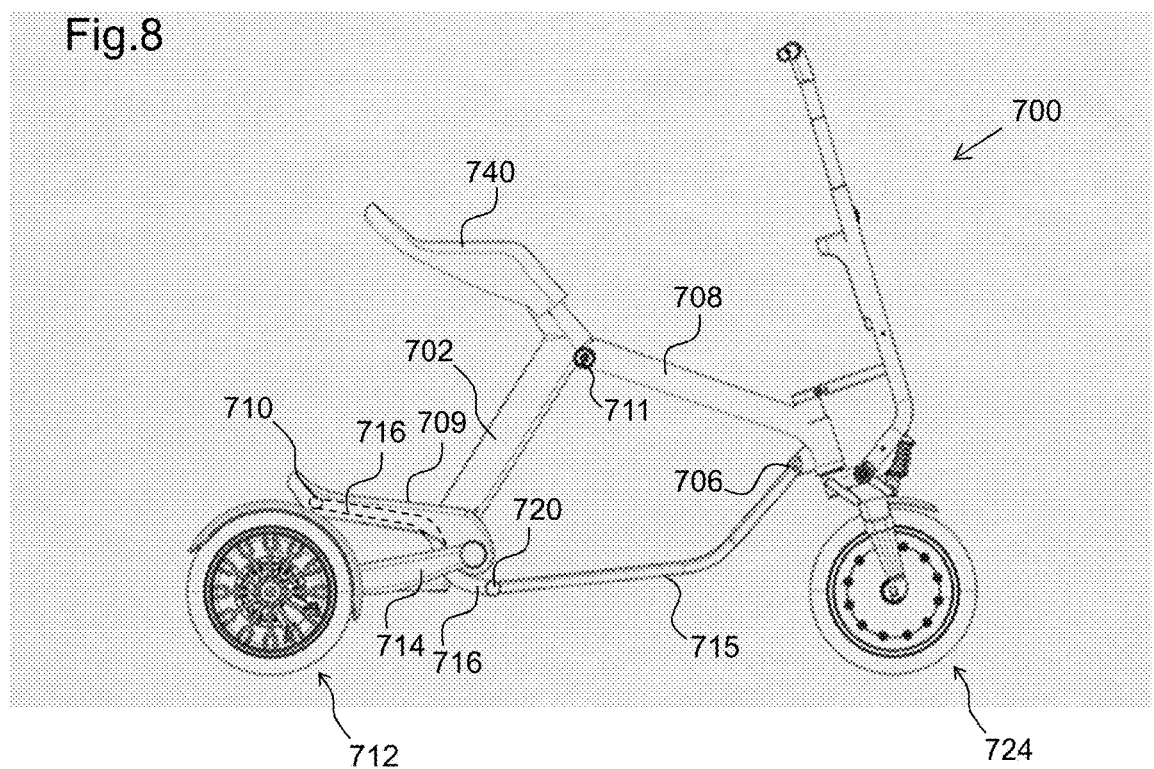

FOLDABLE VEHICLE

CROSS REFERENCE TO RELATED APPLICATION

This application is a National Phase filing under 35 C.F.R. §371 of and claims priority to PCT Patent Application No.: PCT/EP2015/052844, filed on Feb. 11, 2015, which claims the priority benefit under 35 U.S.C. §119 of Netherlands Application No.: 2012245, filed on Feb. 12, 2014, the contents of which are hereby incorporated in their entireties by reference.

FIELD OF THE INVENTION

The invention relates to foldable vehicles that comprise at least two wheels. More in particular, the invention relates to the field of foldable vehicles which have different forms of use in their respective folded and unfolded configuration.

BACKGROUND ART

Several foldable vehicles are known, for example, patent application GB2453796 discloses a foldable vehicle which comprises a box shaped compartment. When the vehicle is folded, the handle bars, gear and pedals and the front wheel may be folded into the box shaped compartment. When the vehicle is completely folded into the compartment, the folded vehicle may be carried by a person as it is a suitcase with two wheels. It is also known that foldable vehicles may have different functions, such as the function of a vehicle to transport a person and the function of a trolley with a luggage compartment that may be pulled. For example, patent application WO99/61304A1 discloses a tricycle which is foldable. The tricycle has two front wheels and one rear wheel. In between the front wheels and the rear wheel are several rods and bars that are rotatably coupled to each other and that couple the front wheels to the rear wheels. The tricycle also comprises pedals coupled to a gear. The gear is coupled to the several rods and bars at a position about in the middle of the front wheels and the rear wheel. When the tricycle is folded, the rear wheel moves to a position in between the front wheels and the several rods and bars and the gear with pedals move in a direction towards a seat of the tricycle and remain at the same side of the front wheels as they were in the unfolded position. In particular the gear is relatively large and when the gear is folded towards a handle bar frame of the tricycle, the gear cannot move any further and thereby the gear defines a limit for making the folded tricycle more compact. The tricycle can be used to transport a person in the unfolded arrangement and may be carried as a trolley in the unfolded configuration. The tricycle also comprises a luggage board which may be unfolded and when the luggage board is unfolded, luggage may be placed on this luggage board. When the folded tricycle is carried as a trolley, the luggage board may be used to carry goods with the folded tricycle.

A problem of the known foldable vehicles is that they are, if they are folded, not very compact and that, consequently, the luggage compartment is relatively small. Furthermore, there is a need to park the vehicle if it is folded in a stable upright position without the need to place the folded vehicle against another object.

SUMMARY OF THE INVENTION

One of the objects of the invention is to provide a foldable vehicle which is more compact if it is folded.

According to the invention, a vehicle is provided as defined in the claims.

Embodiments are defined in the dependent claims.

The provided vehicle is for use as a vehicle and use as a trolley. The vehicle comprises a first side frame, a second side frame and a coupling frame. The first side frame is coupled to a first wheel and the first wheel is rotatable around a first rotational axis. The second side frame is coupled to a second wheel. The second wheel is rotatable around a second (virtual) rotational axis. A first end of the coupling frame is hinged with a first hinge connection to the first side frame and a second end of the coupling frame is hinged with a second hinge connection to the second side frame. The coupling frame comprising a hinge joint in between the first end and the second end and the coupling frame is arranged for allowing, while translating the first rotational axis towards the second rotational axis and vice versa, a downward movement of the hinge joint from an unfolded position to a folded position. The unfolded position of the hinge joint is at a first side of a virtual plane defined by the second rotational axis and a perpendicular crossing the second rotational axis, while the folded position of the hinge joint is at a second side of the virtual plane. The second side of the virtual plane is opposite the first side of the virtual plane. If the hinge joint is in the unfolded position, than the vehicle is in the unfolded configuration and the vehicle is suitable for transporting a person. If the hinge joint is in the folded position, than the vehicle is in the folded configuration and is suitable for at least one of i) use as a trolley and ii) being parked in an upright position.

The folding mechanism of the vehicle is configured such that the hinge joint of the coupling frame passes the virtual plane such that it ends up at another side of the virtual plane (and, thus, at the second side of the another side of the center of the second wheel) and such that the first wheel at least partially ends at a position besides the second wheel. The effect of this specific folding mechanism is that the coupling frame is, like the first wheel, also for a large part very close to the second wheel and, thereby, an envelope of the folded vehicle is relatively compact and does not have many protruding sections (like bars, rods, gear(s) or wheels that protrude out of the folded vehicle). In other words, seen in a side view, when looking toward the vehicle in the folded configuration via a viewing direction that follows the second rotational axis, the first wheel and the second wheel do overlap for the largest part and that the largest part of the coupling frame overlaps with the second wheel. Thereby, even if a luggage compartment is provided to the vehicle, the folded vehicle is relatively compact.

A further advantage of the vehicle that is it may be used as a vehicle to transport a person and that it may be used as a trolley and that it may be parked in its parking position. This multiple use is convenient for an owner of the vehicle.

Optionally, the second side frame is also coupled to a third wheel and the third wheel is rotatable around a third rotational axis, wherein, if the vehicle is in the unfolded configuration and is not driving through a curve, the second rotational axis and the third rotational axis follow the same virtual axis (thus, it seems that the third rotational axis is an extension of the second rotational axis). Thus, according to this optional embodiment, the vehicle is at least a three wheel vehicle, but, may, in other embodiment, also have four wheels (e.g. two wheels are coupled to the first side frame and two other wheels are coupled to the second side frame). In an embodiment of the three wheel vehicle according to the current application, when the hinge joints moves from its folded position to its unfolded position, the hinge joint moves through a space in between the second wheel and the third wheel. In an embodiment, in the folded configuration of the vehicle, the first wheel is at least partially in between the second wheel and the third wheel.

Optionally, if the vehicle comprises three wheels and is in its folded configuration, the first wheel is at least partially in between the second wheel and the third wheel. Thus, the folding of the coupling frame is also configured to allow the movement of the first rotational axis to a position within the space in between the second wheel and the third wheel. This optional configuration leads to a more compact folded vehicle. Note that, when the vehicle has four wheels and the first side frame is coupled to two wheels; both wheels that are coupled to the first side frame may be folded to a position where they are at least partially in between the second wheel and the third wheel. Alternatively, only one of them ends up partially in between the second wheel and the third wheel, while one of the wheels coupled to the second side frame ends up in between the wheels that are coupled to the first side frame.

Optionally, the vehicle comprises a stand for supporting the vehicle when it is parked in the upright parking position. In the parking position the vehicle is at least supported by the stand and the two of the wheels of the vehicle. The stand may be one of: a) an element of the hinge joint when the hinge joint is in its folded position, b) a protruding element coupled to the coupling frame, and c) another protruding element coupled to the first side frame or to the second side frame. In particular, the above optional embodiments for the stand provide a convenient way of parking the vehicle in the folded configuration in the parking position. The stand provides stability and clearly defines, besides the points where the second wheel and third wheel touch the ground (if the vehicle comprises at least three wheels), a third point at which the vehicle in the folded configuration in the parking position rests in the parking position. In particular, when a portion of the hinge joint itself is the stand, no additional components need to be provided to act as a stand, thereby saving weight and materials and preventing that an additional element has to protrude out of the vehicle. If the vehicle is a three wheel vehicle as discussed above, the vehicle is support in the parking position at least by the stand, the second wheel and the third wheel.

Optionally, the mass of the components of the vehicle is distributed along the vehicle such that, if the vehicle is placed in the unfolded configuration with said wheels on the ground, a projected point of gravity is in between positions where said wheels touch the ground, wherein the projected point of gravity is a perpendicular projection of a point of gravity of the vehicle on the ground, and if the vehicle is parked in the folded configuration in the parking position, the projected point of gravity is in between positions where the stand, and the wheels touch the ground. When the projected point of gravity is in between the points where the vehicle rests on the ground, the vehicle has a stable position in its unfolded configuration and in the parking position.

Optionally, the second side frame comprises a main bar or bars which is/are substantially upright directed in both the folded and the unfolded configuration, and wherein the second hinge connection is provided at a construction extending away from the main bar(s) of the second side frame. By positioning the second hinge connection behind the main bar, foldable configurations are possible which are more stable in a folded position as compared to other configurations. Furthermore, it does not require any additional handling of the user to provide the vehicle a stable position while being folded and upright.

Optionally, the coupling frame comprises one or more supporting members, such as pads or wheels, arranged at or near the hinge joint. The pads may be arranged to support the vehicle in the upright position. The pads may be made of a rubber or any other material to improve friction. Instead of pads, wheels may be used, which may be rotatable or which may be fixed or blocked.

Optionally, the first side frame is further hinged with a third hinge connection to the second side frame, the third hinge connection is arranged at a position further away from the wheels than the positions of the first hinge connection and the second hinge connection with respect to the wheels. If the vehicle is folded from the unfolded configuration to the folded configuration, than the first side frame hinges towards the second side frame, and vice versa. This additional coupling between the first side frame and the second side frame provides additional stability and creates a four-bar folding mechanism consisting of a portion of the first side frame, a portion of the second side frame, a first portion of the coupling frame and a second portion of the coupling frame. Furthermore, the additional third hinge connection in combination with a specific design of the first side, second side and coupling frame may be arranged in such a way that, while the vehicle is folded, the risk of ending up in a singular point or singular configuration is prevented.

Optionally, the vehicle further comprises a seat. The seat is coupled to the first side frame or to the second side frame for providing, in the unfolded configuration of the vehicle, a seat for a person that is transported by the vehicle, and for providing, in the folded configuration of the vehicle and if the vehicle is arranged in parking position, a seat for someone who wants to rest on or lean against the folded vehicle. Thus, in particular in the parking position of the vehicle, the vehicle can also be used as a seat to rest on which is very convenient for a user who needs, for example, to rest on a regular basis while carrying the vehicle as a trolley.

Optionally, the seat is coupled to the vehicle such that the position of the seat may be altered, such as, for example, the height may be altered. Optionally, a position of a part of the seat may be altered. Optionally, the coupling between the seat and the vehicle is such that the seat may also be moved between a folded and an unfolded position, and vice versa, such that, when the vehicle is arranged in its folded configuration, the seat may also be folded towards a position which makes the folded vehicle more compact. Optionally, the seat may also be moved to a position which allows a person to rest on the seat when the vehicle is arranged in its parking position.

In the above optional embodiment the vehicle comprises a seat and, thus, it is assumed in that optional embodiment that the person who is transported by the vehicle more or less sits in an upright position on the seat. However, the invention is not limited to such embodiments. In another optional embodiment, the vehicle is provided with a crib or cot for carrying a baby and the crib or cot may be coupled to either the first side frame of the second side frame. In such another optional embodiment, the vehicle may become a foldable stroller. In yet a further embodiment, the above disclosed seat is a seat for carrying a relatively young child. In yet another embodiment, a child seat is provided in addition to the seat for the driver of the vehicle.

Optionally, the vehicle further comprises handle-bars coupled to the first side frame if the seat is coupled to the second side frame or coupled to the second side frame if the seat is coupled to the first side frame. The handle-bars are arranged for steering the vehicle if the vehicle is in the unfolded configuration and the handle-bars are arranged for pulling the vehicle if the vehicle is in the folded configuration and touches the ground with at least two of said wheels the second wheel and the third wheel. Thus, the handle-bars also have a multi-purpose function and are a useful component in the folded configuration and in the unfolded configuration.

Optionally, the handle-bars are coupled to a handle-bars frame. The handle-bars frame is hinged to either the first side frame or the second side frame for allowing moving of the handle-bars from a handle-bars folded position to a handle-bars unfolded position, wherein, if the handle-bars are in the handle-bars unfolded position, than they are further away from the seat than the handle-bars are in the handle-bars folded position. Thus, the handle-bars frame also contributes to the fact that the vehicle may be folded to a relatively compact folded configuration because by moving the handle-bars towards the seat, they do not unnecessary protrude out of the folded vehicle. Furthermore, when they do not protrude out in the folded configuration, the point of gravity of the vehicle remains close to a center of the folded vehicle and thereby a stable parking position is obtained.

Optionally, the vehicle is configured to fold the vehicle from the unfolded configuration to the folded configuration when the handle-bars frame is folded from its unfolded position to its folded position, and vice versa. For example, in the vehicle there is provided a coupling between a hinge connection that allows the folding of the handle-bars frame and the third hinge connection between the first side frame and the second side frame. It is convenient for a user that when he folds one element of the vehicle, other elements automatically fold as well.

Optionally, a coupling of the handle-bars frame to the either the first side frame or the second side frame comprises i) a further hinge joint and ii) a coupling bar. The further hinge joint couples and end of the handle-bars frame to either the first side frame or the second side frame, respectively. The coupling bar is hinged with a first end to the handle-bars frame and with a second end to either the first side frame or the second side frame, respectively. One of the first end or the second end of the coupling bar is hinged with a linear translation hinge joint that is configured to linearly translate when the handle-bars are moved from the handle-bars unfolded position to the handle-bars folded position, and vice versa. Thus, the coupling forms a sort of three bar coupling mechanisms with three hinge points between the three bars. In order to allow one of the three bars (the handle-bars frame) to move towards another one of the three bars (either the first side frame of the second side frame), one of the hinge points must linearly translate to allow the folding of the handle-bars frame towards the seat. The three bar coupling mechanism is a stable coupling and also provides a relatively secure and robust coupling.

The coupling frame comprises a first portion between the first hinge connection and the hinge joint and comprises a second portion between the second hinge connection and the hinge joint. Either the first portion or the second portion is arranged as a feet rest for the person who is transported by the vehicle in its unfolded configuration. Thus, one of the portions of the coupling frame has an additional function as feet rest and, thus, is multifunctional part of the coupling frame. This is an efficient use of components of the vehicle preventing the integration of many components that add additional weight to the vehicle. It is to be noted that the portion that is arranged as a feet rest may comprise, for example, a (small) board on which the feet may be placed.

Optionally, the vehicle comprises a luggage compartment. The luggage compartment is coupled to one of the first side frame and the second side frame. When the vehicle has a seat, the luggage compartment is attached to the same one of the first side frame and the second side frame to which the seat is coupled. Optionally, the luggage compartment is provided below the seat, wherein below refers to a situation when the vehicle is in the parking position or is placed with three wheels on the ground. Optionally, the luggage compartment removably attached, which means that it may be take of the vehicle by the user, for example, to carry the luggage compartment without carrying the vehicle. Thus, the coupling between the luggage compartment and the vehicle is such that it allows a user to attach and remove the luggage compartment. The luggage compartment may be made of a fabric and may also be used as a bag, or the luggage compartment is made of a more rigid material.

Optionally, the vehicle further comprises at least one electric motor that is coupled to at least one of said wheels for driving the wheel to which it is coupled, and, thus, the vehicle. The at least one electric motor being arranged in a proximity of one of said wheels thereby lowering the point of gravity of the vehicle to a position that is below half the height of the vehicle in its folded and in its unfolded configuration. Below refers to an arrangement of the vehicle in its parking position and/or when it is placed with its three wheels on the ground. The vehicle may also comprise a plurality of electric motors being coupled to the different wheels for driving the different wheels. The electric motor(s) may be arranged in a hub of one of the wheels, such as the first wheel, or may be arranged close to the first rotational axis or the second rotational axis. The electric motor(s), when not provided in the hub of at least one of the wheels, may be coupled with a chain or gears to the wheel(s). Optionally, the vehicle comprises pedals coupled to a driving mechanism that is coupled to at least one of the wheels. The pedals are arranged at a position where a user is able to operate them while driving the vehicle.

Optionally, the vehicle also comprises a battery for storing power for the at least one electric motor. Optionally, the battery is arranged at a position at which a point of gravity of the battery is below half the height of the vehicle in its folded and in its unfolded configuration such that the point of gravity of the vehicle is lowered. The term below relates to a situation in which the vehicle is placed with its wheels on the ground or is in its parking position. For example, the battery is coupled to the coupling frame, to the first side frame of the second side frame at a position relatively close to the wheels. In another embodiment, the battery is integrated with bars and rods of the respective frames. Alternatively, instead of a battery, a fuel cell and a holder for fuel are provided. The fuel cell and the holder may, like the battery, be provided at a position which is below half the height of the vehicle in its folded and in its unfolded configuration.

Optionally, a mass of components of the vehicle is distributed along the vehicle such that a point of gravity of the vehicle is below half the height of the vehicle. If the point of gravity of the vehicle is located at a relatively low position, the vehicle has a very stable position and does not tend to fall-over in, for example, a sideward direction. Furthermore, when the vehicle is folded and carried by a person as a trolley, most weight rests on the wheels and not on the handle that is operated by the user. Such a relatively low point of gravity may be obtained by arranging the heavy weight components of the vehicle at a relatively low position (e.g. near the ground, or near the wheels).

BRIEF DESCRIPTION OF THE DRAWINGS

These and other aspects of the invention are apparent from and will be elucidated with reference to the embodiments described hereinafter. In the drawings, FIGS. 1a and 1b schematically present in a side-view an embodiment of a foldable vehicle, FIGS. 2a and 2b schematically present in a side-view another embodiment of a foldable vehicle, FIGS. 3a and 3b schematically present in a side-view alternative embodiments of a foldable vehicle, FIG. 8 shows a side view of the vehicle of FIG. 7, FIG. 9 schematically shows a perspective view of the vehicle of FIG. 7 but in a folded position, FIG. 10 schematically shows a side view of the vehicle of FIG. 7 in its folded position, FIG. 11 schematically shows a side view of part of the vehicle of FIG. 7 according to an embodiment.

It should be noted that items which have the same reference numbers in different Figures, have the same structural features and the same functions, or are the same signals. Where the function and/or structure of such an item has been explained, there is no necessity for repeated explanation thereof in the detailed description.

Some of the Figures are purely diagrammatic and not drawn to scale. Particularly for clarity, some dimensions are exaggerated strongly.

DETAILED DESCRIPTION OF EMBODIMENTS

Figure 1A:
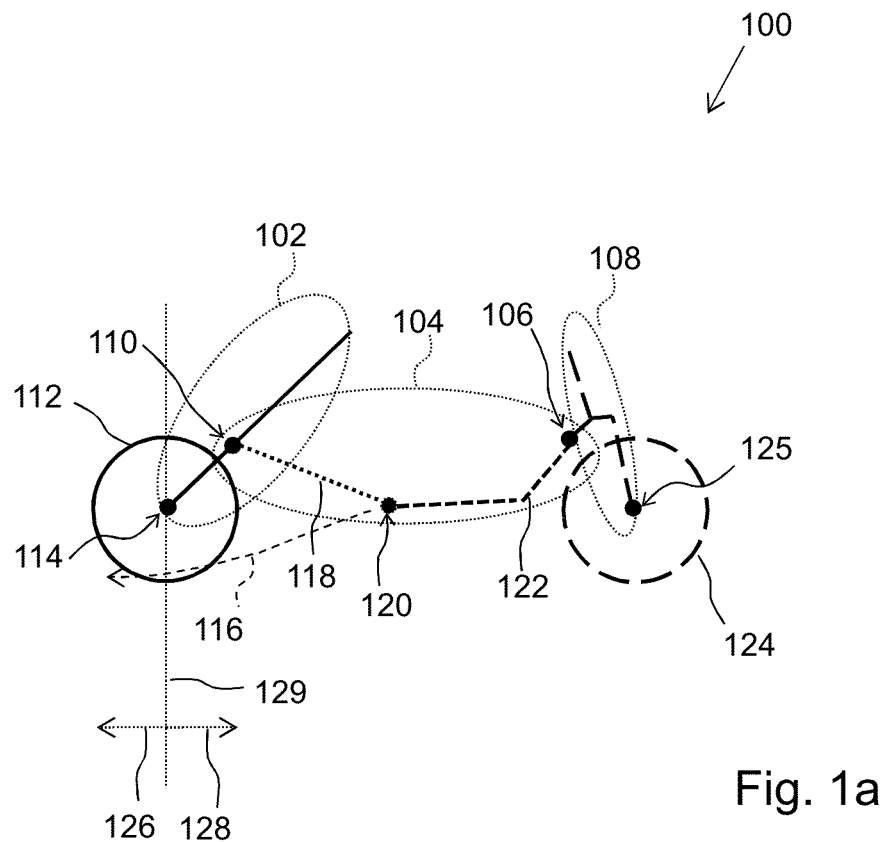
Figure 1B:
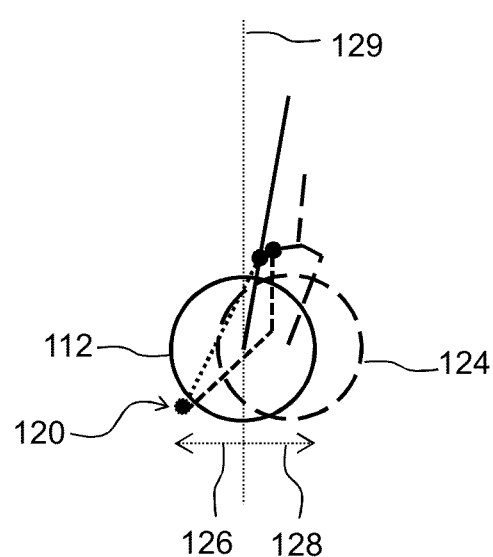

FIGS. 1a and 1b schematically present an embodiment of a foldable vehicle 100. The foldable vehicle 100 has a first side frame 108 which is coupled to a first wheel 124. In FIG. 1a, the first side frame is encircled by the dashed drawn ellipse that is indicated with reference number 108. The first wheel 124 is rotatable around a first rotational axis 125. FIG. 1a presents a side-view and the first rotational axis is arranged perpendicular to a plane of the figure and as such the first rotational axis 125 is presented only by a small circle. The foldable vehicle 100 also has a second side frame 102 that is coupled to a second wheel 112 and a third wheel (not shown). The second wheel 112 and the third wheel are arranged to rotate around a second rotational axis 114. As will be seen later in this document, the second rotational axis is not necessary an axis which completely extend from the second wheel 112 towards the third wheel. If the vehicle 100 is arranged on the ground and/or if the vehicle 100 is driving in a straight direction, at least the axes around which the second wheel 112 rotates and around which the third wheel rotates coincide with a (virtual) second rotational axis 114 that has an orientation perpendicular to the plane of the Figure. Because FIG. 1a presents a side-view of the foldable vehicle 100, only the second wheel 112 is shown and the third wheel is arranged behind the second wheel 112. The second side frame 102 has means (e.g. bars, rod, etc. arranged in a fork-arrangement) that is arranged to couple to both the second wheel 112 and the third wheel. Embodiments of the first side frame and the second side frame are presented later in other side-views and in three-dimensional views. The foldable vehicle 100 has also a coupling frame 104 that comprises at least a first portion 122 and a second portion 118. The coupling frame 104 is coupled with hinged connections to the first side frame 108 and the second side frame 102 and the coupling frame 104 comprises a hinge joint 120 between the first portion 122 and the second portion 118. In FIG. 1a, the first portion 122 is coupled to the first side frame 108 by means of a first hinge connection 106. The first hinge connection 106 allows the first portion of the coupling frame 104 to pivot around a pivot axis that is arranged perpendicular to the plane of FIG. 1a. In FIG. 1a, the second portion 118 is coupled to the second side frame 102 by means of a second hinge connection 110. The second hinge connection 110 allows the second portion 118 of the coupling frame 104 to pivot around a pivot axis that is arranged perpendicular to the plane of FIG. 1a. The hinge joint 120 allows the first portion 122 to hinge/pivot with respect to the second portion 118. An axis around which the first portion 122 and the second portion 118 may pivot relatively to each other is arranged perpendicular to the plane of FIG. 1a.

In FIG. 1a it is assumed that the foldable vehicle 100 is not driving (or, at least not driving through a curve) because it might be that, when the foldable vehicle 100 is driving a curve that the foldable vehicle 100 tilts and, thus, that the first rotational axis 125 and/or the second rotation axis 114 is tilted with respect to a normal to the plane of FIG. 1a.

In FIG. 1a it is assumed that the foldable vehicle 100 is arranged with its wheels 112, 124 on the ground and a perpendicular 129 is drawn through the second rotational axis. The perpendicular 129 together with the (virtual) second rotational axis 114 define a virtual plane. This virtual plane subdivides the total space into a first half-space 128 and a second half-space 126. The foldable vehicle 100 is presented in FIG. 1a in its unfolded configuration and in this unfolded configuration the hinge joint 120 of the coupling frame 104 is arranged in the first half-space 128. The foldable vehicle 100 is arranged to allow a folding of the foldable vehicle 100 in such a way that the hinge joint 120 moves downwards along trajectory 116 towards a location in the second half-space 126. 'Downwards' means towards the ground on which the foldable vehicle 100 is standing. When the foldable vehicle 100 is folded such that the hinge joint 120 moves towards the second half-space 126, the first rotational axis 125 moves/translates towards the second rotational axis 114. Furthermore, the foldable vehicle 100 is arranged such that, when the foldable vehicle 100 is folded and the hinge joint 120 moves towards the second half-space, the first wheel 124 moves towards a position which is at least partially in between the second wheel 112 and the third wheel.

In FIG. 1a, the hinge joint 120 is in its unfolded position. The unfolded position of the hinge joint is in between the first wheel 124 and the second wheel 112 and the third wheel, and, thus, in the first half-space 128. In FIG. 1b, the hinge joint 120 is in its folded position. The folded position is at a side of the second wheel 112 and third wheel that faces away from the first wheel 124. In other words, the folded position of the hinge joint 120 is in the second half-space 126. It is to be noted that in other embodiments, when the foldable vehicle 100 is folded, the first wheel 124 moves further towards the second wheel 112 and third wheel or that the first wheel 124 partially passes the second wheel 112 and third wheel (seen in a side-view such as in FIG. 1a and FIG. 1b).

In FIG. 1b the foldable vehicle 100 is presented in its folded configuration. As discussed above, in the folded configuration, the hinge joint is in the second half-space 126, which means that it is at another side of the second rotational axis 114 than it is in the unfolded configuration, and that the first wheel 124 is at least partially in between the second wheel 112 and the third wheel. In the folded configuration, the foldable vehicle 100 may be arranged in parking position (as shown) and in the parking position the foldable vehicle 100 can rest on the ground. In an embodiment, in the folded configuration and in the parking position, the foldable vehicle 100 rests on the hinge joint 120 (or an element coupled to the hinge joint) and the second wheel 112 and the third wheel. It is to be noted that in the folded configuration the foldable vehicle 100 can also be pulled by a user such that it may be operated as a trolley. As will be discussed later, the foldable vehicle 100 may have a luggage compartment and when the foldable vehicle 100 is in its unfolded configuration or is being used as a trolley, the foldable vehicle 100 is suitable for transporting goods in the luggage compartment.

It is to be noted that the hinge connections 110, 106 and the hinge joint 120 may allow a full free pivoting of the coupled elements with respect to each other, but that they may also allow a limited pivoting e.g. by providing movement limiting elements in the hinge connections 110, 106 and the hinge joint 120. Such movement limiting element clearly defines (and limits) within which angular range two connected element may hinge with respect to each other and, thereby, they may define the folded and the unfolded configuration. Furthermore, the hinge connections 110, 106 and the hinge joint 120 may also be provided with fastening or locking elements which allow the fastening or the locking of the position of the two elements which may pivot with respect to each other. Such fastening or locking element are useful for providing stability and prevent a sudden folding or unfolding of the foldable vehicle 100. Furthermore, the fastening or locking elements provide additional mechanical stability. The fastening and locking elements may be integrated in the hinge connections 110, 106 and the hinge joint 120. The skilled person in the field knows how to design hinge joints and hinge connections, including the optional movement limiting elements and the fastening/locking elements.

In the above discussion of FIGS. 1a and 1b it has been assumed that the foldable vehicle 100 comprises the first wheel 124, the second wheel 112 and the third wheel. In other embodiments, the foldable vehicle comprises four wheels of which two wheels are coupled to the first side frame 108 and two wheels are coupled to the second side frame 102. In another embodiment, the folding mechanism of the application may also be provided in a foldable vehicle which comprises only two wheels of which, as shown in FIGS. 1a and 1b, one wheel is coupled to the first side frame 108 and one wheel is coupled to the second side frame 102.

Figures 2A, 2B:
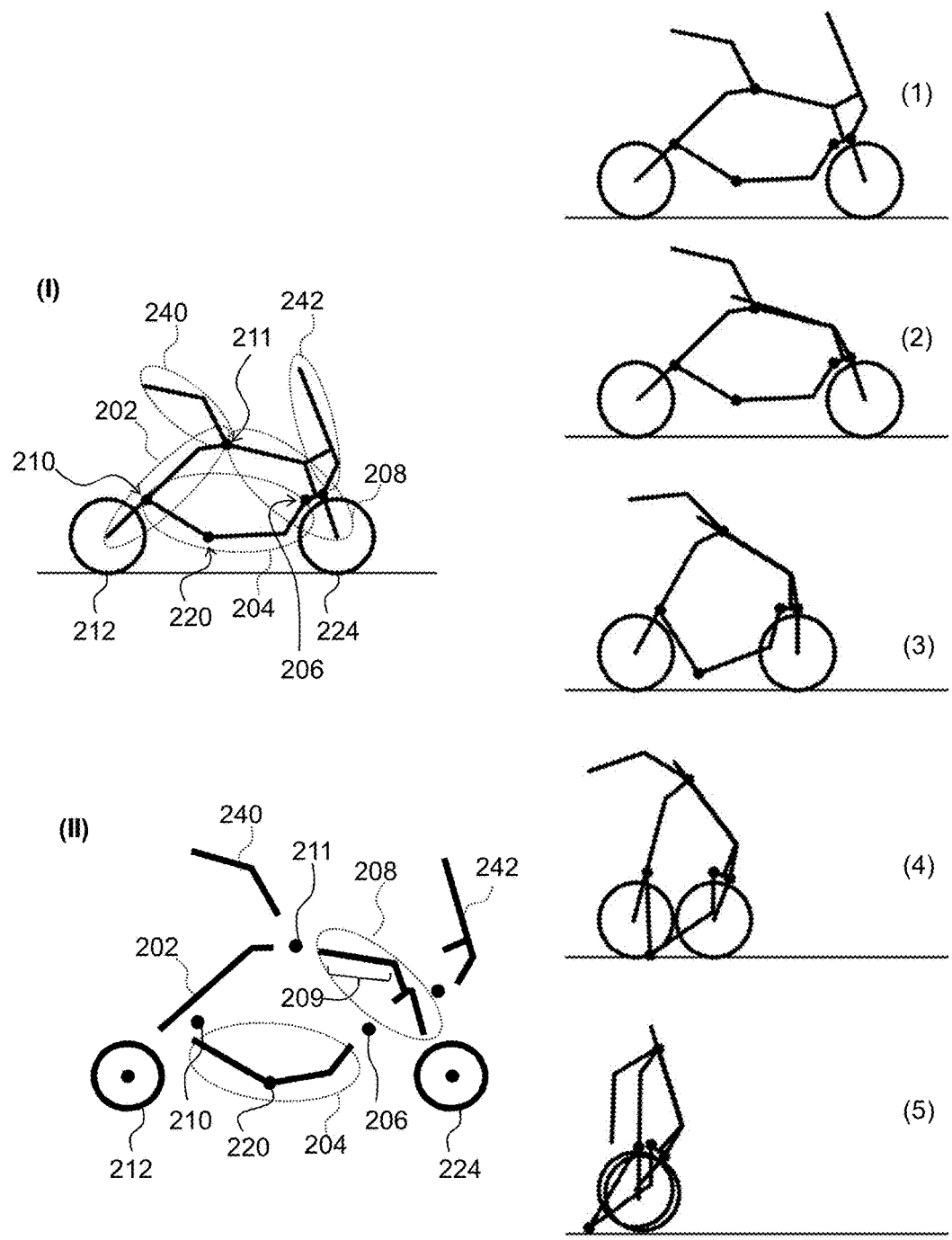

FIGS. 2a and 2b schematically present another embodiment of a foldable vehicle 200. The foldable vehicle 200 is similar to the foldable vehicle 100 of FIGS. 1a and 1b and has similar embodiments with similar effects.

For clarity, FIG. 2a is subdivided into two separate drawings. At the stop end (I) all sub-frames and elements are presented when they are coupled to each other. At the bottom end (II) all sub-frames and elements are drawn separately from each other.

In FIG. 2a the foldable vehicle 200 is presented with a seat 240 and a steer. As such, in FIG. 2a, it is easy to identify a rear side of the foldable vehicle 200 and a front side. In FIG. 2a, the foldable vehicle 200 has one front wheel 224 and two rear wheels 212 (of which one rear wheel is explicitly shown because FIG. 2a presents a side-view of the foldable vehicle 200). Thus, in FIG. 2a, the front side is comparable to the first side of the foldable vehicle 100 of FIG. 1a and the rear side is comparable to the second side of the foldable vehicle 100 of FIG. 1a. However, embodiments are not limited to one front wheel and two rear wheels, as will be presented in the context of FIG. 5b.

The foldable vehicle 200 has a front side frame 208, a rear side frame 202, a coupling frame 204, a seat 240, a handle-bars frame 242, the front wheel 224, the two rear wheels 212, a first hinge connection 206 and a second hinge connection 210. The front wheel 224 is rotatably coupled to the front side frame 208. The handle-bars 242 are coupled to the front side frame 208 such that the handle-bars frame 242 can be folded towards the front side frame 208. Later, in the context of FIG. 5a, a specific coupling mechanism is discussed which allows the folding of the handle-bars frame 242, however, other mechanisms may also be used to fold the handle-bars frame 242 towards the front side frame 208. The handle-bars frame 242 is also coupled to the front wheel 224 such that the handle-bars frame 242 can be used to steer the foldable vehicle 200 (when the foldable vehicle 200 is in the unfolded configuration). Thus, a part of the front side frame 208 which is coupled to the front wheel 224 may be rotated around a steering axis (not shown separately) by operating the handle-bars that are coupled to the handle-bars frame 242

The coupling frame 204 is similar to the coupling frame 104 of the foldable vehicle 100 of FIG. 1a and is coupled in between the front side frame 208 and the rear side frame 202. It is shown in FIG. 2a that the front side frame 208 is also directly coupled to the rear side frame 202 at a location near the seat 240—this coupling is provided by a third hinge connection 211 such that the front side frame 208 may be hinged with respect to the rear side frame 202. Thus, the front side frame 208 comprises at least a sub-frame 209 (e.g. in the form of one rod or bar) which extends towards the rear side frame 202 towards a point close to the seat 240 of the foldable vehicle 200. When the foldable vehicle 200 is placed with its wheels on the ground, the sub-frame 209 is arranged at a higher position than the position of the coupling frame 204 with respect to the ground. This sub-frame 209 provides additional mechanical strength and stiffness to the foldable vehicle 200 and provides an easier folding of the foldable vehicle 200—it also prevents that the folding mechanism ends up in a so-termed singular configuration at which it is unclear in which direction the folding or unfolding continues.

The seat 240 is at least coupled to the rear side frame 202 and may have a fixed relative position with respect to the rear side frame 202. In another embodiment, the seat 240 may also be coupled to the rear side frame 202 by means of a hinge connection such that the seat 240 is foldable towards the rear side frame 202.

FIG. 2b presents several steps of folding the foldable vehicle 200 from a folded configuration (1) at the top end of FIG. 2b towards a folded configuration (5) at the bottom end of FIG. 2b. The unfolding the foldable vehicle 200 in a presented in a reverse direction from (5) to (1). The folding of the foldable vehicle 200 may start with folding the handle-bars frame towards the front side frame 208 as shown in (2). Subsequently, the hinge connections between the front side frame 208, the rear side frame 202, the coupling frame 204 and the hinge joint 220 may be unlocked and the front wheel 224 may be translated/moved towards the rear wheels 212. Thereby the hinge joint 220 moves first in a downwards direction and subsequently in a direction towards the rear wheels 212 as shown in (3) and (4). The hinge joint 220 moves through a space in between the rear wheels 212 towards a position at another side of a rear rotational axis than it was in the unfolded configuration (1). Finally, as shown in (5), the front wheel 224 is in between the rear wheels 212 and the hinge joint 220 is at a position where it may be used to support the foldable vehicle 200 in a parking position. As shown in (5) the seat 240 may also be folded towards a folded position.

Figure 3A:
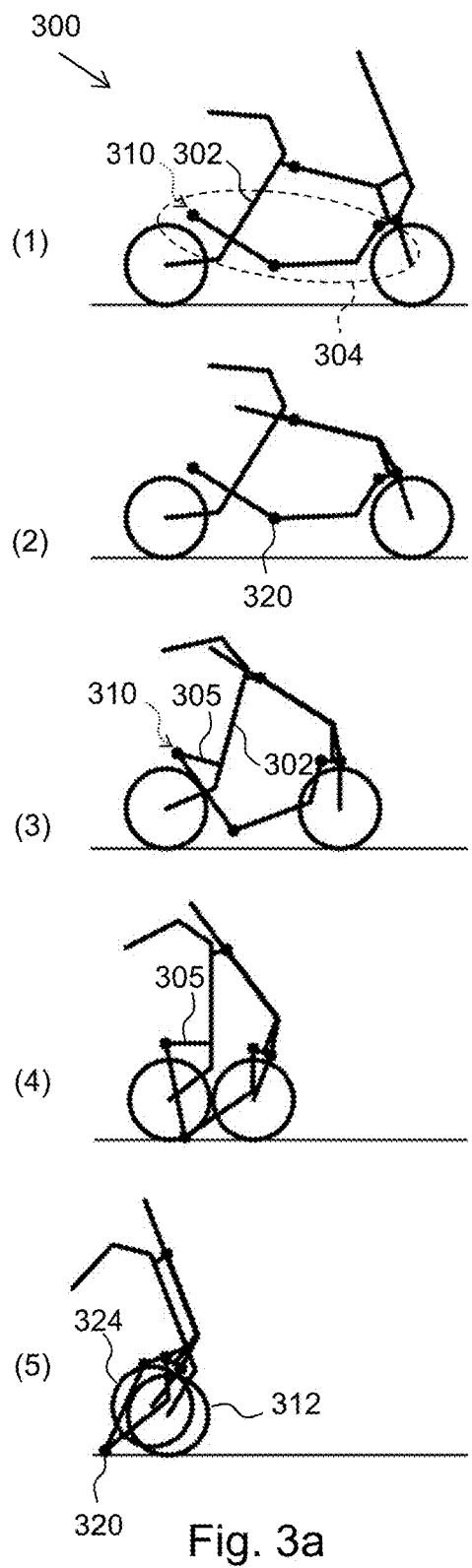
Figure 3B:
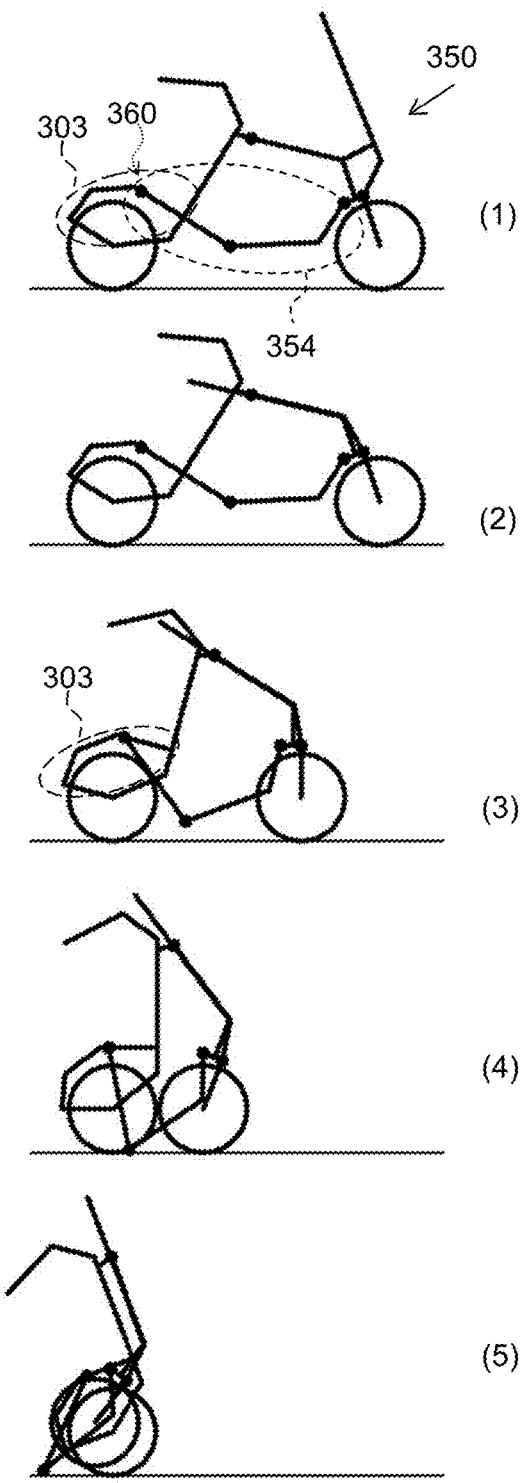

FIGS. 3a and 3b schematically present alternative embodiments of a foldable vehicle 300, 350. In both FIGS. 3a and 3b the foldable vehicle 300, 350 is presented in an unfolded configuration (1) and in subsequent sub-parts of the figures the foldable vehicles 300,350 are more folded such that, as presented at the bottom end (5) of the FIGS. 3a and 3b, the foldable vehicles 300, 350 are presented in their folded configuration. The foldable vehicles 300, 350 are similar to previously presented foldable vehicles 100, 200 and may have similar embodiments with similar effects.

The foldable vehicle 300 of FIG. 3a differs from previously discussed foldable vehicles 100, 200 with respect to how the coupling frame 304 is coupled to the rear side frame. In principle the foldable vehicle 300 may be folded in a similar manner as previously discussed foldable vehicles 100, 200. In this embodiment, it is easier to lock the foldable vehicle 300 in its unfolded configuration. Also, as will be discussed later, a luggage compartment may be provided below the seat and this embodiment provides a larger space for a luggage compartment. The rear side frame and the coupling frame 304 are coupled to each other by a second hinge connection 310 that is provided at a bar or rod 305 that extends away from the main bars or rods 302 of the rear side frame. In the side view of FIG. 3a, at the unfolded configuration (1) this extending bar/rod cannot be seen separately because it is "behind" the bars or rods of the coupling frame 304. However, in a partially folded configuration (3) of the foldable vehicle 300, this extending rod/bar 305 can be well seen near the second hinge connection 310. In previous embodiments, in the folded configuration (5), the front wheel was about exactly in between the rear wheels, see for example FIG. 2b (5). It is to be noted that in embodiments of the vehicle 300, as shown in FIG. 3a (5) the front wheel 324 may, during the folding, completely move into the space between the rear wheels 312 and move even a little bit further such that a portion of the front wheel 324 extends out of the space in between the rear wheels 312 at a side of the rear wheels 312 that is, in the unfolded configuration, facing away from the front wheel 324. When the front wheel 324 is moved beyond the center of the rear wheels 312 (as shown in FIG. 3a (5)) more weight of the foldable vehicle 300 is brought to a position behind (in the drawing left of) the rear wheels 312 which contributes to a stable parking position because it shifts a point of gravity of the foldable vehicle 300 more to a left side of the rear wheels 312. As can be seen from FIG. 3a (5) the foldable vehicle 300 rests at least on the ground with a hinge joint 320 of its coupling frame. The foldable vehicle 300 in its folded configuration (5) is relatively stable when used as trolley (because it rests with two wheels on the ground) and less weight rests in the hand of the user when he carries the foldable vehicle 300 in its folded configuration (5).

The foldable vehicle 350 of FIG. 3b has also a different way of coupling the coupling frame 354 to the rear side frame in comparison to previously presented foldable vehicles 100, 200, 300. In principle the foldable vehicle 300 may be folded in a similar manner as previously discussed foldable vehicles 100, 200, 300. The rear side frame has an extension frame 303 to which the coupling frame 354 is coupling by means of the first hinge connection 360. The extension frame 303 is a part of the rear side frame and is coupled in a fixed way to a remaining part of the rear side frame (and, thus, cannot move relatively to the remaining part of the rear side frame).

Although not explicitly shown in FIGS. 3a and 3b, during the folding the seat may also be folded towards a folded position, which is a position where it is closer to the rear side frame.

Figure 4A:
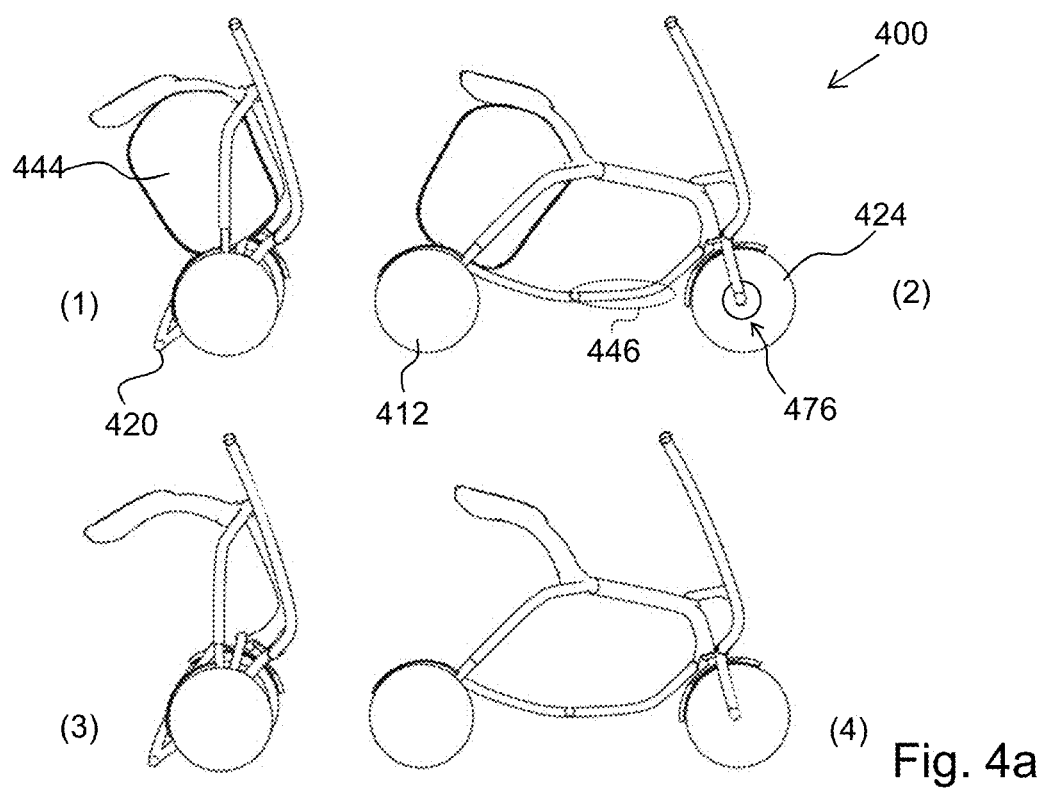
FIGS. 4a and 4b present in a side-view and a three dimensional view embodiments of a foldable vehicle, FIG. 5a schematically presents in a side-view a folding mechanism for handle-bars of the foldable vehicle.
Figure 4B:
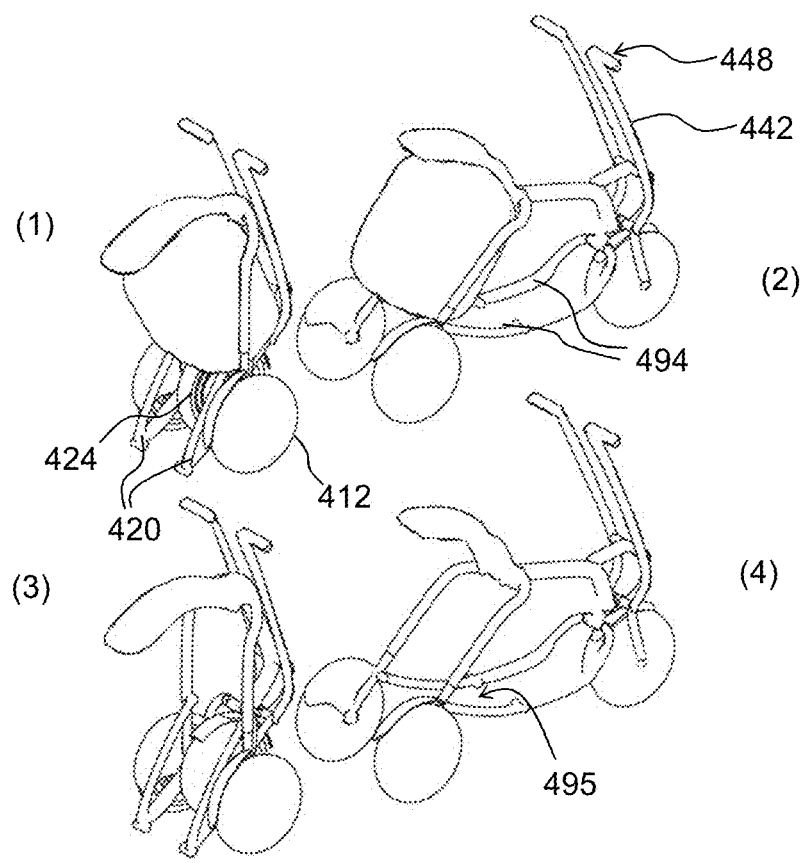

FIGS. 4a and 4b present in a side-view and a three dimensional view embodiments, respectively, of a foldable vehicle 400. The foldable vehicle 400 is similar to previously discussed embodiments of foldable vehicles 100, 200 and may have similar embodiments and effects as these previously discussed embodiments. FIGS. 4a and 4b both present about the same foldable vehicle 400.

At the left top end (1) of FIG. 4a, the foldable vehicle 400 is presented in its folded configuration and the foldable vehicle 400 is arranged in its parking position on the ground. In the parking position, the foldable vehicle 400 rests at least on the ground with a hinge joint 420 of its coupling frame and the two rear wheels 412. In the folded configuration, the front wheel 424 is in between the two rear wheels 412. As shown in FIGS. 4a and 4b, the foldable vehicle may be provided with a luggage compartment 444, for example, a luggage bag made of a flexible material or a luggage box made of a more stiff material. This luggage compartment 444 is detachably attached to the foldable vehicle (in, an embodiment, to the rear side frame), and is provided in a space below the seat and in between the seat and the rear wheels.

At the right top end (2) of FIG. 4a, the foldable vehicle 400 with luggage compartment 444 is presented in its unfolded configuration. A particular portion 446 of the coupling frame is encircled to emphasis that the particular portion 446 of the coupling frame may be used as a rest for the feet of the driver of the foldable vehicle 400. Thus, in other words, the coupling frame has the additional functionality to provide a feet rest when the foldable vehicle 400 is in its unfolded configuration. In the sub-part (2) of FIG. 4a an electric motor 476 is indicated and the electric motor 476 may be provided in the hub of the front wheel 424. This electric motor 476 may receive electric power from a battery that is, for example, provided in the luggage compartment 444. It is to be noted that the battery may also be provided at other positions, as long as the folding of the foldable vehicle 400 is not limited by the battery. Another suitable place for the battery might be under the seat, however, this has the disadvantage that the point of gravity of the foldable vehicle is not lowered by the battery (which is often a relatively heavy component). In a further embodiment, one or two electric motors may also be provided in the hubs of the rear wheels 412. In other embodiments, one or more electric motors may be provided close to the front wheel 424 and/or close to the rear wheels 412 for driving the front wheel 424 and/or close to the rear wheels 412. An advantage of an electric motor provided in the hub of, or close to, the front wheel and/or the rear wheels is that the point of gravity of the foldable vehicle 400 is lowered because of the position of the electric motor. A relatively low point of gravity provides a more stable foldable vehicle 400 in its folded and in its unfolded configuration and provides a more stable driving behavior.

At the bottom end (3), (4) of FIG. 4a the same foldable vehicle is presented but without a luggage compartment 444. As can be seen in (3), when the folded vehicle 400 is in the folded configuration and does not have the luggage compartment 444, a large space below the seat can be used to fold the seat towards the wheels to obtain a more compact foldable vehicle 400 in its folded configuration.

In FIG. 4b the foldable vehicle 400 has been presented in a three dimensional view. Sub-parts (1) and (2) present the foldable vehicle 400 in its folded and unfolded configuration, respectively, and present the foldable vehicle with the luggage compartment. Sub-parts (3) and (4) present the foldable vehicle 400 without the luggage compartment in its folded and unfolded configuration, respectively. In the three dimensional views some parts of the foldable vehicle 400 can be seen better. We like to emphasize that the handle-bars frame 442 may optionally comprise a sort of panel which is arranged perpendicular to the driving direction and, of course, comprises the handle-bars 448. In (1) and (3) it can be seen that the handle-bars 448 are well accessible in the folded configuration and, thus, that the handle-bars 448 can be used by a user to pull the foldable vehicle 400 in its folded configuration such that it becomes a trolley. It can also be seen in (1) and (3) that when the foldable vehicle 400 in its folded configuration is positioned in its parking position, the seat can be used by a user as a resting seat and, thus, an additional function of the foldable vehicle 400 in its folded configuration may be that it provides a resting chair/stool.

In sub-part (2) of FIG. 4b it can also be seen that the coupling frame may comprise two parallel arranged rods 494 which each comprise a hinge joint and that the two hinge joints 420 of the two parallel arranged rods 494 in the folded configuration (see (1) and (2)) function as a stand on which the foldable vehicle 400 may rest. In sub-part (4) of FIG. 4b, between the two parallel arranged rods 494, an area 495 is indicated. The area 495 is also a suitable place for arranging a battery for providing power to the electric motor 476 of the foldable vehicle 400. The battery should have such a size that it does not limit the folding of the foldable vehicle 400 and, thus, as shown in (1) and (3) of FIG. 4b, that it still allows the folding of the front wheel 424 in between the rear wheels 412 as shown. It is further to be noted that it can be seen in sub-parts (1) and (2) that the foldable vehicle 400 rests on the hinge joints 420 of the two parallel arranged bars 494 of the coupling frame and on the rear wheels 412 and, in the folded configuration, the front wheel 424 is partially in between the rear wheels 412 and that the front wheel 424 does not touch the ground.

Figure 5A:
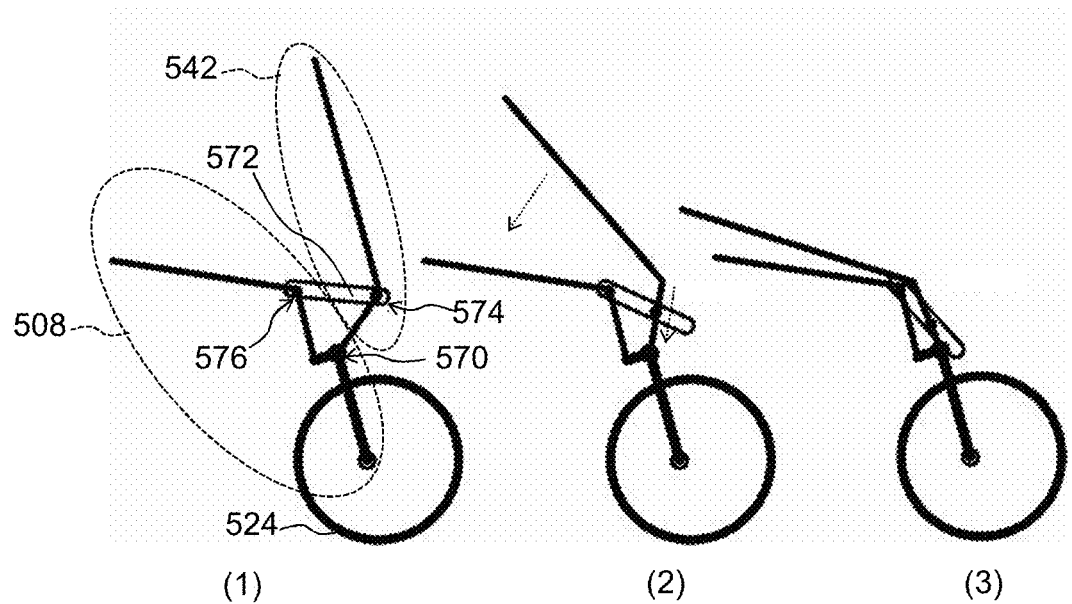
FIG. 5b presents in a three dimensional view an embodiment of a foldable vehicle with two front wheels and one rear wheel.

FIG. 5a schematically presents an embodiment of a folding mechanism for handle-bars frame 542 of the foldable vehicle. At the left end (1) the handle-bars frame is presented in its unfolded configuration and at the right end (3) the handle-bars frame is its folded configuration. FIG. 5a presents a portion of embodiments of previously discussed foldable vehicles. The portion presents, the front side frame 508, the front wheel 524 and the handle-bars frame 542. The handle bars-frame 542 is hinged to the front side frame 508 by a further hinge joint 570. In addition, a coupling bar 572 is provided which is coupled by means of a hinge connection 576 to the front side frame 508 and which is coupled by a linear translation hinge joint 574 to the handle-bars frame 542. The linear translation hinge joint 574 may be moved in a linear direction along the handle-bars frame 542 as shown in (2) and (3). The coupling bar 572 is, for example, provided with a slit through which the linear translation hinge joint 574 may linearly move to obtain the folding as shown in (2) and (3). This specific folding mechanism for the handle-bars frame 542 is well suitable for allowing the handle-bars frame to be used as a steer for the foldable vehicle and provide enough stiffness when the handle-bars frame is unfolded (as shown in (1)). The linear translation hinge joint 574 may, for example, also be provided with a locking or fastening mechanism to fasten the handle-bars frame 542 in its unfolded configuration and/or in its folded configuration. The current invention is not limited to the presented embodiment of the folding mechanism for the handle-bars frame 542.

In an embodiment, the folding mechanism of the handle-bars frame 542 is coupled to the other folding mechanism(s) of the vehicle. For example, when the handle-bars frame 542 is folded, the front side frame also folds towards the rear side frame. In the context of FIGS. 2b, 3a and 3b it means that the separate step (2) of folding the handle-bars frame towards the front side frame is not anymore a separate step, but while folding the handle-bars frame towards the front side frame, the steps (3) to (5) are also executed. In an embodiment, the foldable vehicle comprises in the further hinge joint 570 some gears coupled to the handle-bars frame 542. The gears are, for example, coupled by a chain, or cables (which are present in the bars/rods of the first side frame) to gears that are present in the third hinge connection (e.g. hinge connection 211 in FIG. 2a). The gears of the third hinge connection are, for example, coupled to the rear side frame such that, when the handle-bars frame 542 hinges with respect to the front side frame, the rear side frame also hinges with respect to the front side frame.

Figure 5B:
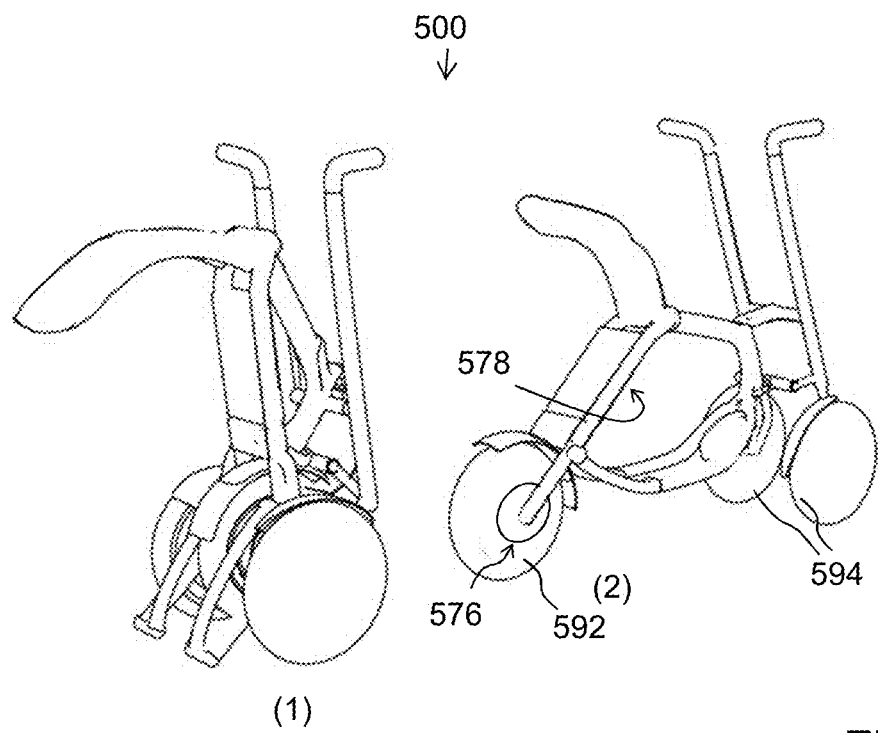

FIG. 5b presents in a three dimensional view an embodiment of a foldable vehicle 500 with two front wheels 594 and one rear wheel 592. As discussed before, embodiments of the foldable vehicle are not limited to embodiments with only one front wheel and two rear wheels. In FIG. 5b it is been presented that the other way around is also a possible embodiment. With respect to other characteristics, the foldable vehicle 500 is similar to previously presented and discussed foldable vehicles. At the left end (1) of FIG. 5b, the foldable vehicle 500 is presented in its folded configuration and when arranged in its parking position, and at the right end (2) of FIG. 5b, the foldable vehicle 500 is presented in its unfolded configuration. Further points to be noted are: the hub of the rear wheel 576 is optionally provided with an electric motor and a space 578 behind a panel of the rear side frame may be used to attach a battery to the foldable vehicle 500.

Figure 6A:
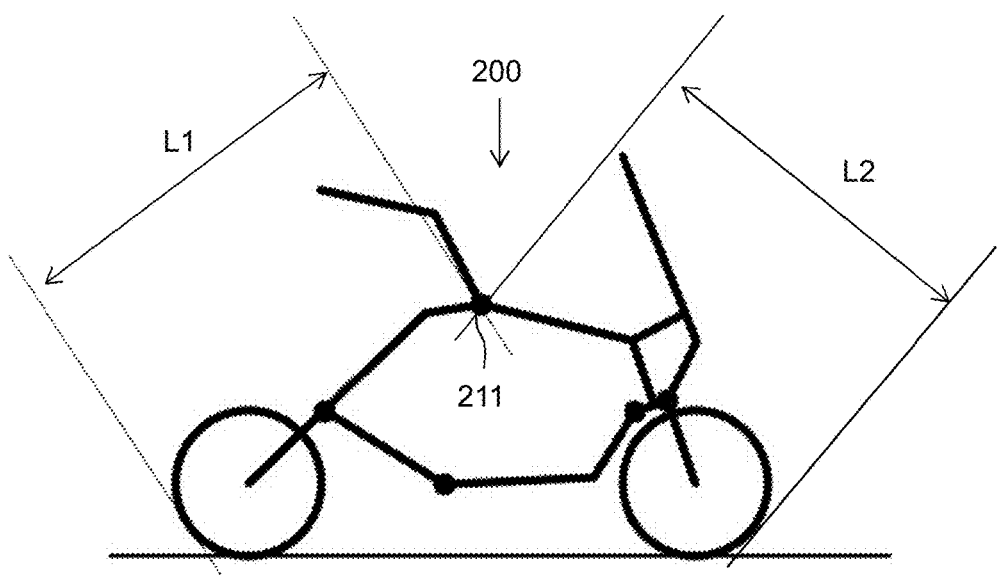
FIGS. 6a and 6b present in a side-view geometrical characteristics of an embodiment of a foldable vehicle, FIG. 7. schematically shows a perspective view of a further embodiment of the foldable vehicle.
Figure 6B:
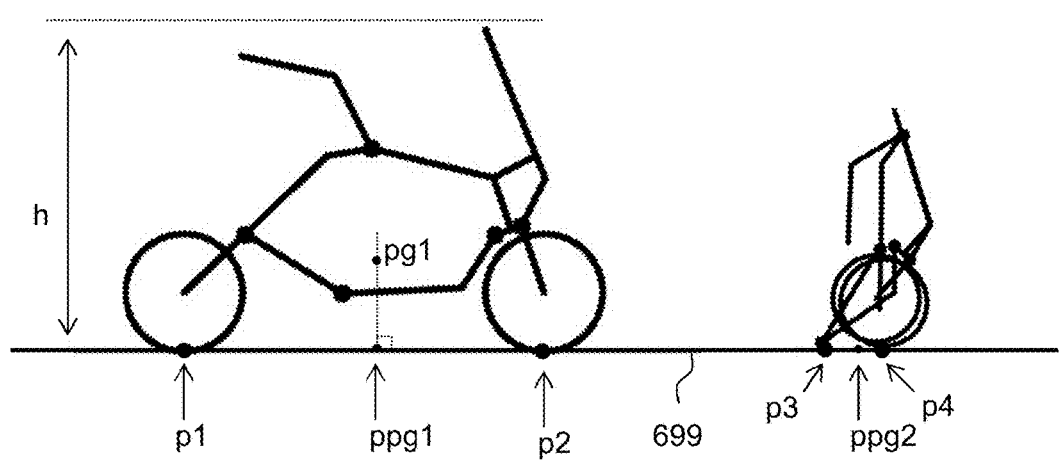

FIGS. 6a and 6b present geometrical characteristics of an embodiment of a foldable vehicle 200. The presented foldable vehicle 200 is already discussed in the context of FIGS. 2a and 2b and it must be noted that the presented information of FIGS. 6a and 6b also applies to the other embodiments of the foldable vehicles and that the skilled person is capable of applying the information provided for foldable vehicle 200 towards useful boundary conditions for the geometry of other embodiments.

In FIG. 6a a first distance L1 is indicated between the third hinge connection 211 (which is a hinge connection between the rear side frame and the front side frame) and a point on an outer surface of the rear wheel(s)—the point being furthest away from the third hinge connection 211. A second distance L2 is indicated which is a distance from the third hinge connection 211 and a point on an outer surface of the front wheel—the point being furthest away from the third hinge connection 211. When, in the folded configuration and in the parking position, the foldable vehicle 200 has to rest on its rear wheels, the first distance L1 may be larger than the second distance L2. In another embodiment, if the first distance L1 is equal to the second distance L2, the foldable vehicle 200, when being arranged in its folded configuration and being arranged in its parking position, rests with all wheels on the ground and may also rest on the hinge joint 220 or an element being directly coupled to the hinge joint 220. In practical embodiments, the length of the first distance L1 shall be comparable to the length of the second distance L2, however, both distances may differ within certain limits from each other depending on the location where the first wheel ends up when the foldable vehicle is in its folded configuration and depending on a length of other parts of the foldable vehicle.

FIG. 6b presents advantageous positions of the point of gravity (pg) and the projected point of gravity (ppg) of the foldable vehicle 200. In FIG. 6b line 699 schematically represents a surface of the ground on which the foldable vehicle is arranged. At the left end of the Figure the foldable vehicle is placed on the ground with its wheels (points p1 and p2) and at the right end of the Figure the foldable vehicle is placed on the ground with at least its rear wheels (point p4) and with its hinge joint (point p3).

When the foldable vehicle is in its unfolded configuration (as shown at the left end of FIG. 6b), the point of gravity pg1 of the unfolded configuration is preferably below half the height h of the foldable vehicle (seen in a direction perpendicular on the ground 699) and in between the rotational axes of the front wheel and of the rear wheels (seen in a direction parallel to the ground 699). Such a point of gravity provides a stable foldable vehicle which does not easily fall over and which has a stable driving behavior. Preferably, relatively heavy components of the foldable vehicle such as an electro motor and a battery are arranged at a position relatively close to the ground such that the point of gravity is lowered to a position below half the height h of the foldable vehicle. When this point of gravity pg1 is subsequently perpendicularly projected on the ground 699, the projected point of gravity ppg1 of the foldable vehicle in its unfolded configuration is in between the points p1, p2 where the front wheel and the rear wheels are in contact with the ground 699. In a top view (not shown), the three points where the front wheel and the rear wheels touch the ground form a triangle, and seen in a top view the project point of gravity ppg1 should fall within this triangle.

When the foldable vehicle is arranged in its folded configuration (as shown at the right end of FIG. 6b), the foldable vehicle is in contact with the ground with at least its rear wheels, which contact point is schematically indicated with p4, and with its hinge joint, which contact point is schematically indicated with p3. The point of gravity of the foldable vehicle in its folded configuration (not explicitly shown) should be relatively low and at such a location that, when it is perpendicularly projected to the project point of gravity ppg2, the projected point of gravity ppg2 is in between points p3 and p4. To obtain such a point of gravity, the foldable vehicle should be carefully designed such that enough weight is in the folded configuration at (as schematically drawn in FIG. 6b) left side of point p4. For example, the coupling frame is for the largest part left of point p4 and also a significant portion of the seat. Furthermore, the design of the foldable vehicle may be such that the battery is, for example, in the folded configuration left of point p4. It is to be noted that a luggage compartment that is provided below the seat (as presented in FIG. 4) has also influence on the point of gravity of the foldable vehicle. In particular in the folded configuration at the right end of FIG. 6b, when a luggage compartment is provided below the seat, more weight of the folded foldable vehicle is left of point p4, which is advantageous to get the project point of gravity in between points p3 and p4. In an embodiment, as shown in FIG. 3a, 3b sub-part (5), in the folded configuration, the front wheel is at a position in between points p3 and p4 such that the weight of the components of the foldable vehicle in the folded configured is better distributed for obtaining a stable foldable vehicle in the parking position. During the folding, some mass of the foldable vehicle moves. In order to obtain a projected point of gravity that is nicely in between the points p3 and p4, enough moving mass has to move during the folding from one side of the rear wheels to another side of the rear wheels. As discussed above this may be obtained by arranging the battery at a position such that is moves from one side of the rear wheels to another side of the rear wheels (e.g. by arranging the battery at the second portion of the coupling frame) and by designing the folding mechanism such that the front wheel (which optionally comprises an electromotor) moves during the folding to another side of the rear wheels.

FIG. 7 schematically shows a perspective view of a further embodiment of the foldable vehicle 700. The vehicle 700 comprises a front wheel 724 and two rear wheels 712, only one of which is visible in FIG. 7. The vehicle 700 is motor driven with an electric motor arranged in a hub of the front wheel 724. The vehicle 700 further comprises a seat 740, a handle bar frame 742 and handle bars 748. A light module 750 is arranged onto the handle bar frame 742. The vehicle 700 also comprises a front frame element 708 arranged between the seat 740 and the handle bar frame. Below the seat 740 is a main back frame rod 702, a bow 709 and a battery 707. The lighting module 750 and the motor may be powered by the battery.

The vehicle 700 comprise a coupling frame which is formed by two S-shaped rods 716, two curved wooden slats 715 and a bridge 713 arranged at a hinge joint 720, see also FIG. 8 which shows a side view of the vehicle. The curved wooden slats 715 are rotatably arranged onto the front frame element 708 at a hinge connection 706. The S-shaped rods 716 are rotatably arranged onto the bow 709 at a hinge connection 710, see also FIG. 8. The back wheels are attached to the back frame via support rods 714. The support rods are connected to the back frame by means of a suspension mechanism at a rotation point 721. Each of the back wheels 712 is able to slightly translate relative to the back frame (i.e. the main back frame rod 702).

It is noted that the bridge 713 at the hinge joint 720 could be left out, however the bridge 713 improves the strength of the coupling frame. As can be seen form FIG. 8, part of the S-shaped rods 716 are enclosed by the bow 709 if the vehicle is in the unfolded state. Due to the presences of the hinges 711, 710, 720 and 706, the two hinges 710 and 706 will be forced further apart once a user is sitting on the seat 740. This means that the coupling frame is stretched out and that the hinge joint 720 is forced upwards. However, this upwards movement of the hinge joint 720 is limited by the abutment of the S-shaped rods 716 onto an interior of the bow 709. If the user places his feet onto the wooden slats 715, a certain force is applied which may vary according to the circumstances. The user may push the slats 715 so much that the hinge joint is pushed downwards and the S-shaped rods 716 will rotate relative to the bow 709. In fact, this will be experienced by the user as an additional suspension inside the vehicle which may improve comfort while riding It is noted that the slat can be made out of a flexible material such as flexible wooden slats, but alternatively the slats may be stiff. They may alternatively be made out plastic or metal, or any other suitable material.

Figure 9:
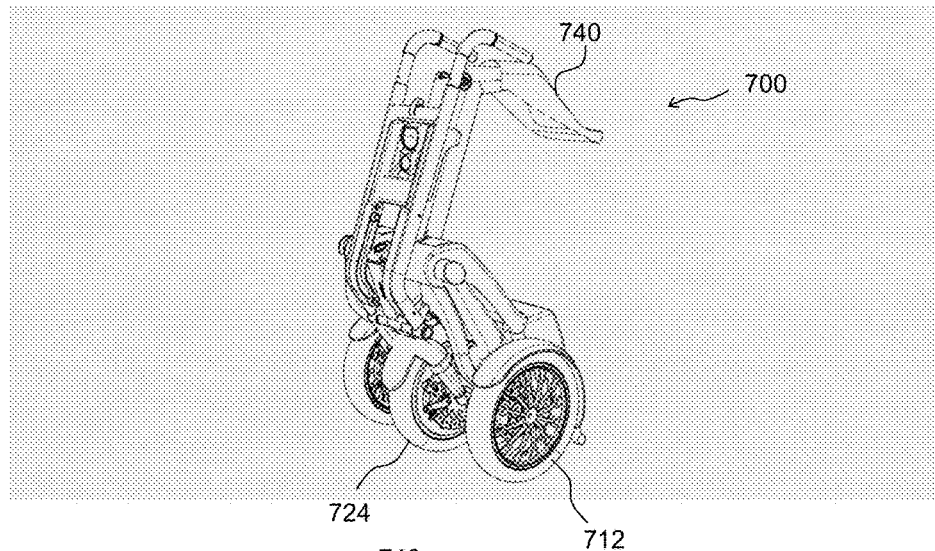

FIG. 9 schematically shows a perspective view of the vehicle 700 of FIG. 7 but in a folded position. As can be seen the front wheel is moved in between the two rear wheels. This makes the folded vehicle very compact and it can easily be used as a trolley. In case the front wheel is driven by means of an electric motor, the front wheel is preferably not touching the ground when the vehicle 700 is used as a trolley. In this way unnecessary friction is avoided.

Figure 10:
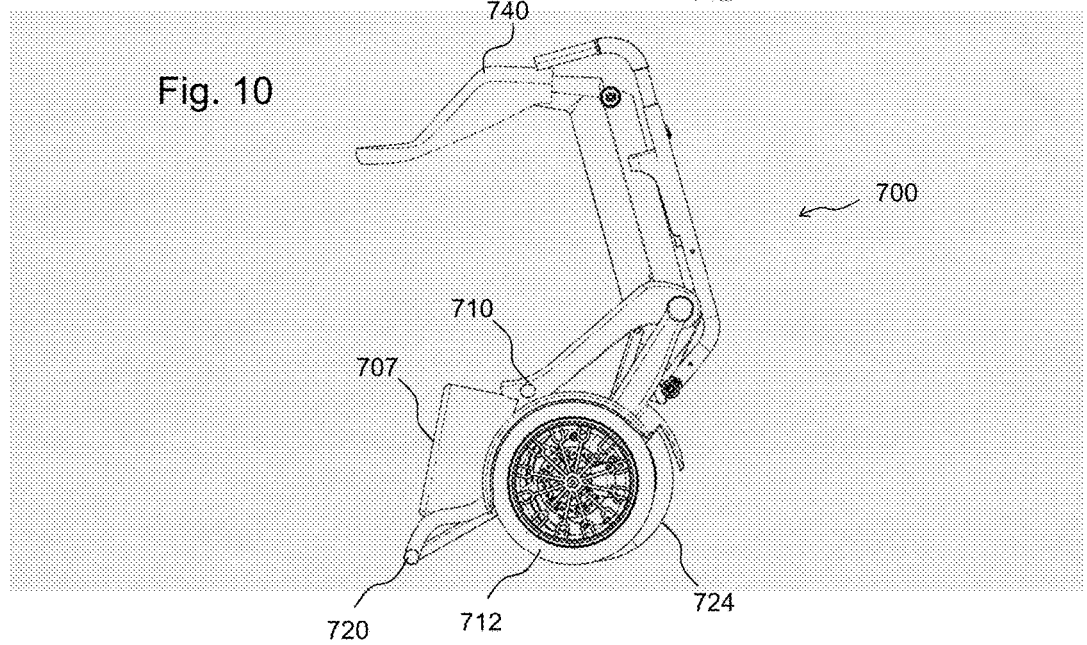

FIG. 10 schematically shows a side view of the vehicle 700 in its folded position. The vehicle can stand on its own due to the proper distribution to the weight of the components and due to the fact that the coupling frame is folded in such a way that the hinge joint is onto (or near) the ground. The way of folding the vehicle 700 is similar to the folding of frame 300 shown in FIGS. 3a (1)-(5).

Figure 11:
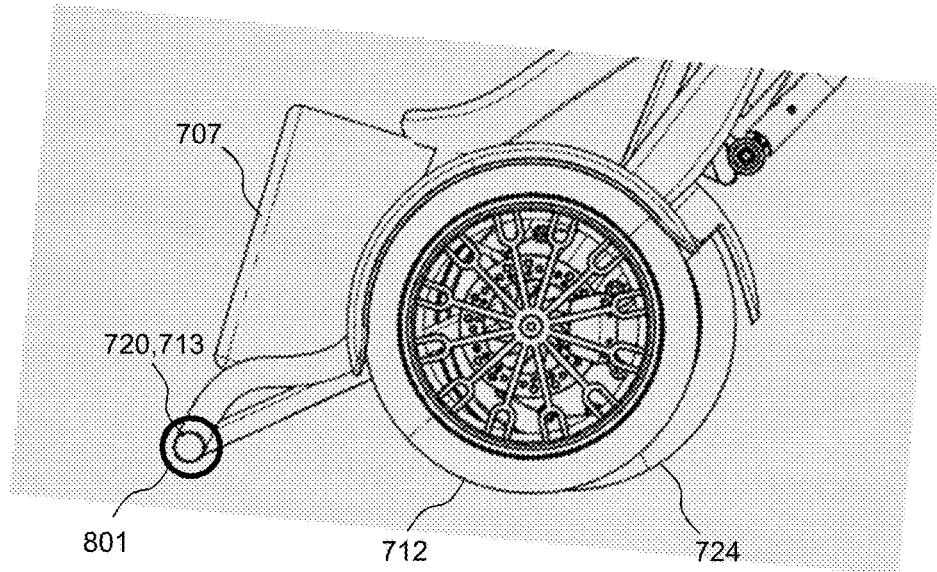
Figure 12:
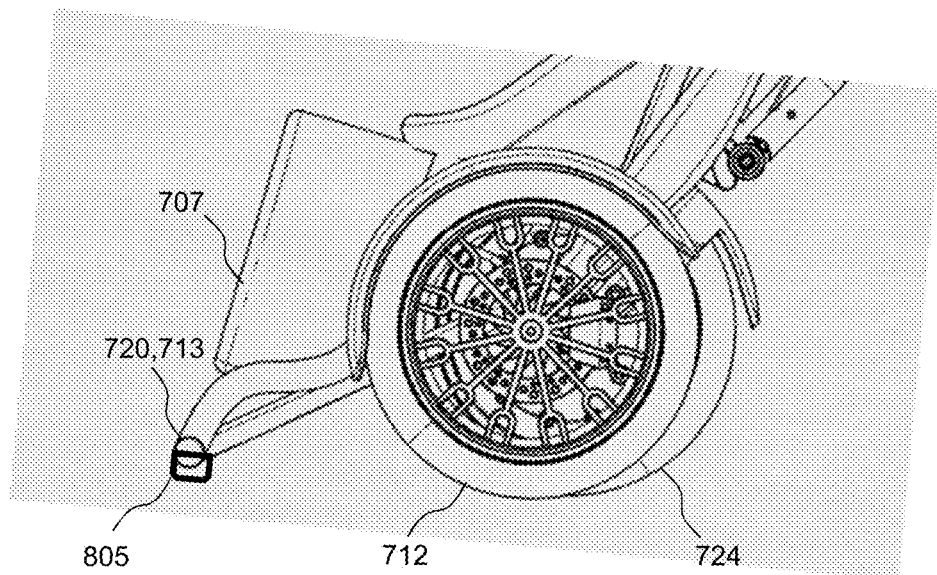
FIG. 12 shows a different embodiment of FIG. 7 wherein the vehicle is supported at the hinge joint by way of pads.

FIG. 11 schematically shows a side view of part of the vehicle 700 according to an embodiment. In this embodiment the vehicle 700 comprises additional small rotatable wheels or fixed discs 801 arranged onto outer ends of the bridge 713. It is noted that the discs or wheels may be arranged anywhere along the bridge. Also if the bridge is absent, the wheels or discs can be arranged at the hinge joint 720. FIG. 12 shows a different embodiment wherein the vehicle is supported at the hinge joint by way of pads, which may be rubber pads. It is also noted that the vehicle may comprise a stand which is connected to the coupling frame at or near the hinge joint 720. The stand may be a rod which operates as a support in case the vehicle is folded and placed/held in its upright position.

In summary, the application provides a vehicle for use as a vehicle if being unfolded and for use as a trolley if being folded. The vehicle in its folded configuration may also be placed in a parking position. The vehicle comprises a first side frame coupled to a first wheel, a second side frame coupled to a second wheel and a coupling frame. The coupling frame comprises a hinge joint between a first end and a second end of the coupling frame. The first end is hinged to the first side frame and the second end is hinged to the second side frame. When the first wheel translates towards the second wheel, the hinge joint moves from one side of the second wheel to the other side of the second wheel.

It should be noted that the above-mentioned embodiments illustrate rather than limit the invention, and that those skilled in the art will be able to design many alternative embodiments. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be used to advantage.

The invention claimed is:

1. A vehicle for use as a vehicle and use as a trolley that is pulled, the vehicle comprising:
   a first side frame coupled to a first wheel, the first wheel is rotatable around a first rotational axis,
   a second side frame coupled to a second wheel, the second wheel being rotatable around a second rotational axis, and
   a coupling frame, a first end of the coupling frame being hinged with a first hinge connection to the first side frame and a second end of the coupling frame being hinged with a second hinge connection to the second side frame, the coupling frame comprising a hinge joint in between the first end and the second end, and the coupling frame is arranged for allowing or obtaining, while translating the first rotational axis towards the second rotational axis and vice versa, a downward movement of the hinge joint from an unfolded position in between the first wheel and the second wheel to a folded position, and vice versa, wherein, in the unfolded position, the hinge joint is at a first side of a virtual plane defined by the second rotational axis and a perpendicular crossing the second rotational axis, in the folded position, the hinge joint is at a second side of the virtual plane, the second side being opposite the first side, wherein:
   if the hinge joint is in the unfolded position, the vehicle is in the unfolded configuration and the vehicle is suitable for transporting a person,
   if the hinge joint is in the folded position, the vehicle is in the folded configuration and is suitable for at least one of:
      i) use as a trolley, and
      ii) being parked in an upright position.

2. The vehicle according to claim 1, wherein the vehicle comprises:
   a stand for supporting the vehicle in the upright position, wherein in the upright position the vehicle is at least supported by the stand, and two of the wheels, the stand is one of:
      a) an element of the hinge joint,
      b) a protruding element coupled to the coupling frame, and
      c) another protruding element coupled to the first side frame or to the second side frame.

3. The vehicle according to claim 2, wherein, a mass of the components of the vehicle is distributed along the vehicle such that,
   if the vehicle is placed in the unfolded configuration with the wheels on the ground, a projected point of gravity is in between positions where the wheels touch the ground, wherein the projected point of gravity is a perpendicular projection of a point of gravity of the vehicle on the ground, and
   if the vehicle is parked in the folded configuration in the upright position, the projected point of gravity is in between positions where the stand, and at least two of the wheels touch the ground.

4. The vehicle according to claim 1, wherein the second side frame comprises a main bar or bars which is/are substantially upright directed in both the folded and the unfolded configuration, and wherein the second hinge connection is provided at a construction extending away from the main bar(s) of the second side frame.

5. The vehicle according to claim 1, wherein the coupling frame includes one or more supporting members, such as pads or wheels, arranged at or near the hinge joint.

6. The vehicle according to claim 1, wherein the first side frame is further hinged with a third hinge connection to the second side frame, the third hinge connection is arranged at a position further away from the wheels than the positions of the first hinge connection and the second hinge connection, and wherein the third hinge connection is arranged to, if the vehicle is folded from the unfolded configuration to the folded configuration, to hinge the first side frame towards the second side frame.

7. The vehicle according to claim 1, further comprising a seat, the seat being coupled to the first side frame to the second side frame for providing, in the unfolded configuration of the vehicle, a seat for a person that is transported by the vehicle, and for providing, in the folded configuration of the vehicle when parked in the upright position, a seat for someone who wants to rest on or lean against the folded vehicle.

8. The vehicle according to claim 7, further comprising handle-bars coupled to the first side frame if the seat is coupled to the second side frame or coupled to the second side frame if the seat is coupled to the first side frame, the handle-bars are arranged for steering the vehicle if the vehicle is in the unfolded configuration and are arranged for pulling the vehicle if the vehicle is in the folded configuration and touches the ground with at least two of the wheels.

9. The vehicle according to claim 8, wherein the handle-bars are coupled to a handle-bars frame, the handle-bars frame being hinged to either the first side frame or the second side frame for allowing moving of the handle-bars from a handle-bars folded position to a handle-bars unfolded position, wherein, if the handle-bars are in the handle-bars unfolded position, than the handle-bars are further away from the seat than they are in the handle-bars folded position.

10. The vehicle according to claim 9, wherein the vehicle is configured to fold the vehicle from the unfolded configuration to the folded configuration when then handle-bars frame is folded from its unfolded position to its folded position, and vice versa.

11. The vehicle according to claim 1, wherein the coupling frame comprises a first portion between the first hinge connection and the hinge joint and comprises a second portion between the second hinge connection and the hinge joint, wherein either the first portion or the second portion is arranged as a feet support for the person who is transported by the vehicle in its unfolded configuration.

12. The vehicle according to claim 1, further comprising a luggage compartment, the luggage compartment being coupled to one of the first side frame or the second side frame, the luggage compartment is coupled to one of the first side frame or the second side frame to which the seat is also coupled.

13. The vehicle according to claim 1 further comprising at least one electric motor being coupled to one of the wheels for driving the vehicle, the at least one electric motor being arranged in a proximity of the one of the wheels.

14. The vehicle according to claim 13, wherein the electric motor is arranged in a hub of the first wheel.

15. The vehicle according to claim 13, further comprising a battery for storing power for the at least one electric motor, and the battery is optionally arranged at a position at which a point of gravity of the battery is below half the height of the vehicle in its folded and in its unfolded configuration for lowering the point of gravity of the vehicle.

16. The vehicle according to claim 1, wherein a mass of components of the vehicle is distributed along the vehicle such that a point of gravity of the vehicle is below half the height of the vehicle.

* * * * *